July 22, 1924.

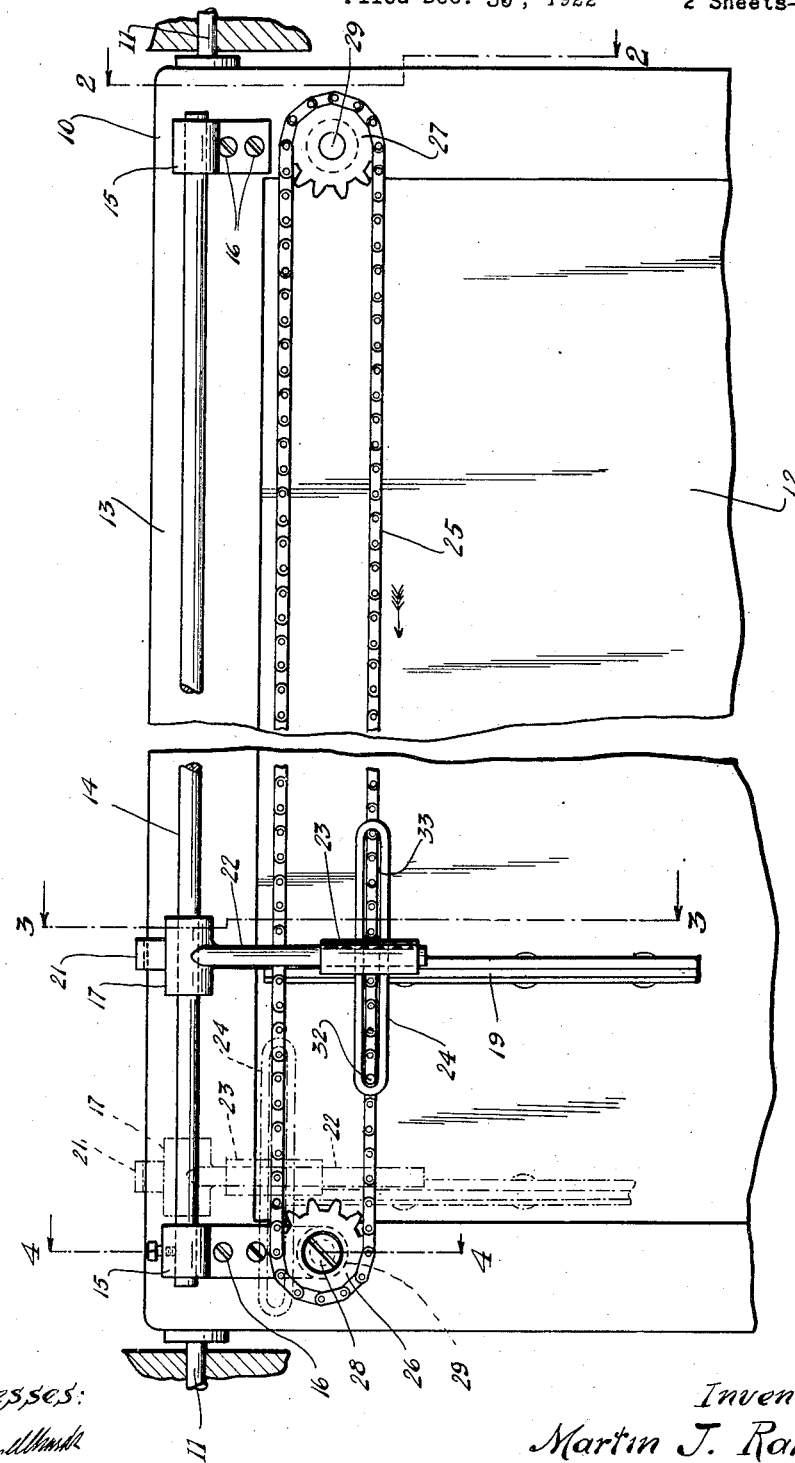

M. J. RAFFERTY

WINDSHIELD WIPER

Filed Dec. 30, 1922  2 Sheets-Sheet 2

1,502,589

Witnesses:

Inventor:
Martin J. Rafferty
By Joshua R. H. Potts.
His Attorney

Patented July 22, 1924.

1,502,589

UNITED STATES PATENT OFFICE.

MARTIN J. RAFFERTY, OF CHICAGO, ILLINOIS.

WINDSHIELD WIPER.

Application filed December 30, 1922. Serial No. 610,066.

*To all whom it may concern:*

Be it known that I, MARTIN J. RAFFERTY, a citizen of the United States, and a resident of the city of Chicago, county of Cook, and State of Illinois, have invented certain new and useful Improvements in Windshield Wipers, of which the following is a specification.

My invention relates to new and useful improvements in wind shield wipers and has for its principal object the provision of an improved construction of this character which will be highly efficient in use. The present invention constitutes an improvement over that disclosed in an application filed by me in the United States Patent Office on or about December 7, 1922, Serial No. 605,421 for improvements in wind shield wipers.

One of the objects of the present invention is to provide efficient driving means for reciprocating the wiping members across the glass of the wind shield and it being the object to provide such driving means which will be simple in structure.

Other objects will appear hereinafter.

The invention consists in the combinations and arrangements of parts hereinafter described and claimed.

The invention will be best understood by reference to the accompanying drawings forming a part of this specification, and in which, Fig. 1, is an elevational view of a wind-shield showing my improved wind-shield-wiper associated therewith;

Figure 4:
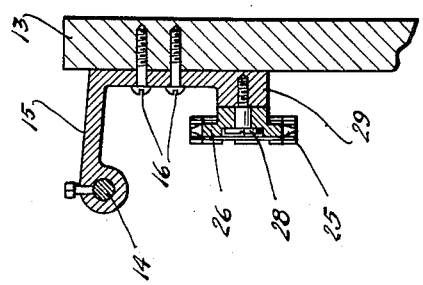
Fig. 4, is a sectional view taken substantially on line 4—4 of Fig. 1.
Figure 3:
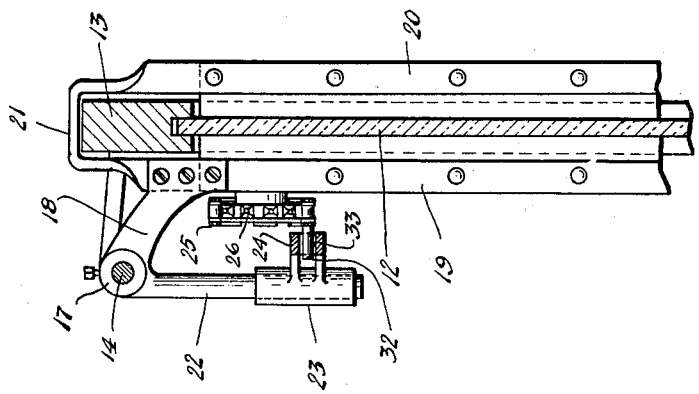
Fig. 3, is a sectional view taken substantially on line 3—3 of Fig. 1.
Figure 2:
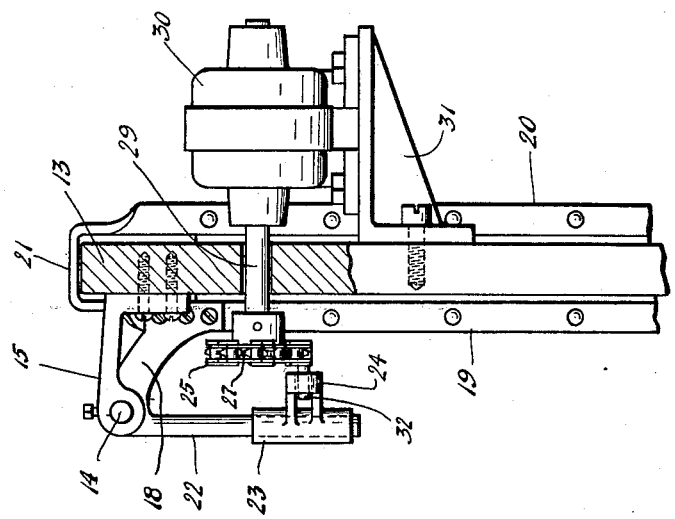
Fig. 2, is a sectional view taken substantially on line 2—2 of Fig. 1.

Referring to the drawings, 10 indicates a windshield pivotally mounted as at 11 and 12 indicates the windshield glass. Arranged in spaced relation with respect to the outer face of the frame 13 of the wind-shield is a rod member 14 carried by brackets 15 fixed to the wind-shield frame by suitable machine screws 16. Mounted for movement on the rod member 14, is a carriage 17 having an integral arm 18 detachably carrying the wind-shield wipers 19 and 20, said wind-shield wipers being operatively connected together by a U-shaped portion 21 and are adapted to engage the inner and outer surfaces of the wind-shield glass 12. The carriage 17 also carries an integral depending arm 22 carrying a member 23 for slidable movement, the member 23 being provided with an integral horizontal slotted member 24.

The means for reciprocating the wipers across the surfaces of the wind-shield glass 12 comprises a continuous chain member 25 mounted to travel over sprockets 26 and 27 continuously in one direction as indicated by the arrow in Fig. 1. The sprocket 26 is carried by a shaft 28 screw threaded in a depending portion 29 of one of the brackets 15, as shown in Fig. 4. The sprocket 27 is carried by a motor shaft 29 of a motor 30 mounted on a bracket 31 carried by the wind-shield frame 13 on the inner face thereof. The slotted portion 24 is operatively connected to the chain member 25 by a lateral pin 32 adapted to work in the slot 33 of the portion 24. The arrangement of the member 23 is such that the pin member 32 travelling around the sprockets 26 and 27 will move the member on the depending arm 22 so as to permit the pin to travel in the return direction, and draw the carriage 17 to which the wipers are attached in such direction.

By this arrangement I dispense with the necessity of employing mechanism for reversing the travel of the wipers, and provide a simple arrangement for reciprocating the wiper members across the surfaces of the wind-shield glass.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. Operating mechanism of the class described including a member adapted to be mounted for continuous movement in one direction, means adapted to support a carriage for a reciprocatory movement, a carriage on the support, means arranged and adapted to have slidable relation with the carriage and provided with a portion having an elongated slot formed therein, and means carried by the said first named member engaged in said slot and adapted at the completion of each stroke of the carriage to shift the means having slidable relation with the carriage to reverse the direction of movement of the carriage.

2. Operating mechanism of the class described including a reciprocatory carriage, a member adapted and arranged to have slidable relation with the carriage and provided with a portion having an elongated slot formed therein, a member adapted to be mounted for continuous movement in one direction, and means carried by said last named member and engaged in said slot adapted at the completion of each stroke of the carriage to shift the first named member to reverse the direction of travel of the carriage.

3. Operating mechanism of the class described including a member adapted to be mounted for continuous movement in one direction, means providing a support for a carriage, a carriage mounted for reciprocatory movement on the support and provided with a depending portion, a member adapted for slidable movement on the depending portion and provided with a horizontal portion having an elongated slot formed therein, a pin member carried by said first named member and engaged in said slot adapted at the completion of each stroke of the carriage to shift the last named member to reverse the direction of movement of the carriage.

4. Operating mechanism of the class described including a supporting member, a reciprocatory carriage on said supporting member and provided with a depending portion, a member mounted for slidable movement on the depending portion and provided with a horizontal portion having an elongated slot formed therein, a member adapted to be mounted for continuous movement in one direction and having means engaging the slot to effect slidable movement of the slidably mounted member, and means for moving said movable member in said direction.

In testimony whereof I have signed my name to this specification in the presence of two subscribing witnesses.

MARTIN J. RAFFERTY.

Witnesses:
FREDA C. APPLETON,
JOSHUA R. H. POTTS.